United States Patent
Salo

(10) Patent No.: US 7,787,861 B2
(45) Date of Patent: Aug. 31, 2010

(54) SERIALIZED PREVENTION OF DUPLICATE CHARGING DATA RECORDS

(75) Inventor: Mika Salo, Espoo (FI)

(73) Assignee: Nokia Corporation, Espoo (FI)

( * ) Notice: Subject to any disclaimer, the term of this patent is extended or adjusted under 35 U.S.C. 154(b) by 709 days.

(21) Appl. No.: 11/703,746

(22) Filed: Feb. 8, 2007

(65) Prior Publication Data

US 2008/0125082 A1    May 29, 2008

(30) Foreign Application Priority Data

Nov. 23, 2006   (FI)   ................................ 20061035

(51) Int. Cl.
    H04M 11/00    (2006.01)

(52) U.S. Cl. ...................... 455/408; 455/406

(58) Field of Classification Search ................ 455/406, 455/408
    See application file for complete search history.

(56) References Cited

U.S. PATENT DOCUMENTS 7,417,948 B2*   8/2008   Sjoblom ..................... 370/229

OTHER PUBLICATIONS

3GPP TS 32.215, V5.9.0: $3^{rd}$ Generation Partnership Project; Technical Specification Group Services and System Aspects; *Telecommunication Management; Charging Management; Charging Data Description for the Packet Switched (PS) Domain* (Release 5); Jun. 2005.

* cited by examiner

*Primary Examiner*—Barry W Taylor
(74) *Attorney, Agent, or Firm*—Alston & Bird LLP

(57) ABSTRACT

The invention allows serialized prevention of duplicate charging records so that loss of charging data records does not occur even in cases of multiple charging gateways being down or otherwise unreachable at a time. In response to detecting no acknowledgement received from a first charging data record collection unit for a charging data record set, it is checked whether processing of any charging data record set marked as a potential duplicate is currently pending. In response to discovering pending processing of at least one charging data record set marked as a potential duplicate, completion of the pending processing is detected. In response to the detected completion, a second charging data record collection unit is selected as a temporary backup. The charging data record set is then transferred to the second charging data record collection unit for processing as a potential duplicate.

20 Claims, 2 Drawing Sheets

SERIALIZED PREVENTION OF DUPLICATE CHARGING DATA RECORDS

BACKGROUND OF THE INVENTION

1. Field of the Invention

The invention generally relates to telecommunications. In particular, the invention relates to serialized prevention of duplicate charging records.

2. Description of the Related Art

Traditional circuit switched telecommunications networks—both wired and wireless—typically base billing on connection time, such as call duration. Network elements, typically switching centers, generate records that contain user specific information about provided services for billing purposes. In the context of the circuit switched telecommunications networks these records are often called "call detail records".

With the advent of mobile packet data telecommunications networks various packet switched services have been introduced to consumers. In such second generation (2G) mobile telecommunications networks as Global System for Mobile Communications (GSM) and Code Division Multiple Access (CDMA) networks, packet data services are typically provided with General Packet Radio Service (GPRS) technology. Third Generation Partnership Project (3GPP) mobile telecommunications networks, often based on Wideband Code Division Multiple Access (W-CDMA), also have their associated packet data services which typically are further developments of the General Packet Radio Service technology.

Packet switched data allows providing a significantly increased amount of various data services. Packet switched data also allows more billing grounds. For example, charging may be based on volumes of data transferred rather than connection time.

The increased amount of data services and their associated billing options has led to a situation in which more and more network elements process records containing user specific information about provided packet data services for billing purposes, which records are often called "charging data records" in the context of the packet switched telecommunications networks.

There are more network elements generating the records compared to traditional circuit switched telecommunications networks. For example, Serving General Packet Radio Service Support Nodes (SGSN) and Gateway General Packet Radio Service Support Nodes (GGSN) may generate charging data records. The generated charging data records are typically collected by a charging gateway which consolidates the records and transfers them to a billing system.

Today, there are typically multiple charging gateways per one charging data record generating network element due to e.g. large volumes of various types of charging data records generated. This increased complexity leads to increased probability of fault situations, such as to increased probability of a charging gateway going down.

Prior art, such as technical specification 3GPP TS-32.215 issued by the 3$^{rd}$ Generation Partnership Project, teaches procedures to be taken in a case of one charging gateway being down at a time. However, as discussed above, today there often are multiple charging gateways used to consolidate and transfer charging data records from a charging data record generating network element to a billing system. Therefore, there is a possibility of more than one charging gateway being down or otherwise unavailable at a time. Yet, prior art includes no specific procedures for such situations, Rather, in prior art the same procedures are taken in a case of multiple charging gateways being down at a time as when only one charging gateway is down. This may result in lost charging data records, as discussed next in more detail.

Let us consider a situation in which a Serving General Packet Radio Service Support Node is generating charging data records which are transferred to three charging gateways: CG1, CG2 and CG3. During normal operation, CG1 operates as primary charging gateway, and Mobility Management generated records (M-CDR), SGSN delivered Short message Mobile Originated records (SMO-CDR) and SGSN delivered Short message Mobile Terminated records (SMT-CDR) are to be transferred to CG1, whereas SGSN generated records (S-CDR) are to be transferred to CG3. CG2 is to operate as a backup for CG1.

Now, if CG1 goes down or cannot otherwise be reached by SGSN, charging data record sets which were sent to CG1 but for which no acknowledgement was received, are re-transferred to CG2. Since SGSN has no knowledge of whether CG1 received and successfully processed the charging data record sets, the charging data record sets re-transferred to CG2 are marked as potential duplicates. As a result, CG2 does not process the received charging data record sets and forward them to a billing system immediately. Rather, CG2 stores the received charging data record sets temporarily to await further instructions from SGSN.

Let us assume that the charging data record sets originally sent to CG1 and re-transferred to CG2 and marked as potential duplicates are assigned first sequence numbers 1 to 250 to identify them. Since CG2 is now operating as a primary charging gateway, newly generated M-CDR, SMO-CDR and SMT-CDR record sets will also be sent to CG2. These newly generated record sets will be assigned second sequence numbers starting from 251. Assuming CG1 remains unreachable, these second sequence numbers will reach 65535 (or 0xFFFF) after which sequence numbers to be assigned will revert back to 0.

As mentioned above, S-CDR records were to be sent to CG3. However, if CG3 also goes down or cannot otherwise be reached by SGSN, the S-CDR record sets which were sent to CG3 but for which no acknowledgement was received, are also re-transferred to CG2 and marked as potential duplicates. Assuming this retransmission occurs after the above second sequence numbers reached 65535, the S-CDR record sets originally sent to CG3 and re-transferred to CG2 and marked as potential duplicates are assigned third sequence numbers starting again from 0.

As a result, CG2 has received two different transmissions of charging data record sets marked as potential duplicates which both have been assigned sequence numbers starting from 0: the charging data record sets originally sent to CG1 and the charging data record sets originally sent to CG3.

Due to the identical sequence numbers assigned CG2 refuses to accept the latter charging data record sets with identical sequence numbers, i.e. the charging data record sets originally sent to CG3. CG2 notifies SGSN about the rejection of the charging data record sets originally sent to CG3. However, since CG2 will use the assigned sequence numbers to identify the rejected charging data record sets, SGSN cannot tell whether CG2 means the charging data record sets originally sent to CG1 or the charging data record sets originally sent to CG3. As a result, loss of charging data record sets may occur.

SUMMARY OF THE INVENTION

A first aspect of the present invention is a method in which it is detected that no acknowledgement has been received within a predetermined acknowledgement period for a given charging data record set transmitted from a charging data record generation unit of a mobile telecommunications network to a first charging data record collection unit of a group of charging data record collection units associated with the charging data record generation unit. It is checked whether processing of any charging data record set marked as a potential duplicate is currently pending with any charging data record collection unit of the group of charging data record collection units.

In response to discovering pending processing of at least one charging data record set marked as a potential duplicate, completion of the pending processing of the at least one charging data record set marked as a potential duplicate is detected. Further in response to the detected completion of the pending processing, a second charging data record collection unit of the group of charging data record collection units is selected as a temporary backup charging data record collection unit. Furthermore, the given charging data record set is transferred to the selected second charging data record collection unit for processing as a potential duplicate.

A second aspect of the present invention is an apparatus which comprises a detector configured to detect whether an acknowledgement is received within a predetermined acknowledgement period for a given charging data record set transmitted from a charging data record generation unit of a mobile telecommunications network to a first charging data record collection unit of a group of charging data record collection units associated with the charging data record generation unit.

The apparatus of the second aspect further comprises a checker configured to check, in response to no acknowledgement detected as received within the predetermined acknowledgement period, whether processing of any charging data record set marked as a potential duplicate is currently pending with any charging data record collection unit of the group of charging data record collection units.

The apparatus of the second aspect further comprises a serializer configured, in response to a discovered pending processing of at least one charging data record set marked as a potential duplicate, (i) to detect completion of the pending processing of the at least one charging data record set marked as a potential duplicate; (ii) to select, further in response to the detected completion of the pending processing, a second charging data record collection unit of the group of charging data record collection units as a temporary backup charging data record collection unit; and (iii) to transfer the given charging data record set to the selected second charging data record collection unit for processing as a potential duplicate.

A third aspect of the present invention is an apparatus which comprises a detecting means for detecting whether an acknowledgement is received within a predetermined acknowledgement period for a given charging data record set transmitted from a charging data record generation unit of a mobile telecommunications network to a first charging data record collection unit of a group of charging data record collection units associated with the charging data record generation unit.

The apparatus of the third aspect further comprises a checking means for checking, in response to no acknowledgement detected as received within the predetermined acknowledgement period, whether processing of any charging data record set marked as a potential duplicate is currently pending with any charging data record collection unit of the group of charging data record collection units.

The apparatus of the third aspect further comprises a serializing means for, in response to a discovered pending processing of at least one charging data record set marked as a potential duplicate, (i) detecting completion of the pending processing of the at least one charging data record set marked as a potential duplicate; (ii) selecting, in response to the detected completion of the pending processing, a second charging data record collection unit of the group of charging data record collection units as a temporary backup charging data record collection unit; and (iii) transferring the given charging data record set to the selected second charging data record collection unit for processing as a potential duplicate.

A fourth aspect of the present invention is a computer program embodied on a computer readable medium, the computer program controlling a data-processing device to perform the steps of:

detecting no acknowledgement received within a predetermined acknowledgement period for a given charging data record set transmitted from a charging data record generation unit of a mobile telecommunications network to a first charging data record collection unit of a group of charging data record collection units associated with the charging data record generation unit;

checking whether processing of any charging data record set marked as a potential duplicate is currently pending with any charging data record collection unit of the group of charging data record collection units; and in response to discovering pending processing of at least one charging data record set marked as a potential duplicate:

(i) detecting completion of the pending processing of the at least one charging data record set marked as a potential duplicate;

(ii) selecting, further in response to the detected completion of the pending processing, a second charging data record collection unit of the group of charging data record collection units as a temporary backup charging data record collection unit; and (iii) transferring the given charging data record set to the selected second charging data record collection unit for processing as a potential duplicate.

In an embodiment of the invention, it is checked, after the detection of the completion of the pending processing, whether a status response was received from the first charging data record collection unit after the predetermined acknowledgement period. Further is this embodiment, the selection of the second charging data record collection unit is performed further in response to discovering no received status response.

In an embodiment of the invention, in response to discovering no pending processing of any charging data record set marked as a potential duplicate, a second charging data record collection unit of the group of charging data record collection units is selected as a temporary backup charging data record collection unit, and the given charging data record set is transferred to the selected second charging data record collection unit for processing as a potential duplicate.

In an embodiment of the invention, the completion of the discovered pending processing of the at least one charging data record set marked as a potential duplicate further comprises detecting duration of the discovered pending processing, and terminating the discovered pending processing in response to the detected duration exceeding a predetermined threshold.

In an embodiment of the invention, the charging data record generation unit of the mobile telecommunications network comprises a serving general packet radio service support node.

In an embodiment of the invention, at least one charging data record collection unit of the group of charging data record collection units associated with the charging data record generation unit comprises a charging gateway configured to collect charging data records from the associated charging data record generation unit, and to forward at least one of the collected charging data records and charging information based on the collected charging data records to a billing system.

In an embodiment of the invention, the mobile telecommunications network comprises a mobile packet data telecommunications network.

The embodiments of the invention described above may be used in any combination with each other. Several of the embodiments may be combined together to form a further embodiment of the invention. A method, an apparatus, a network element or a computer program which is an aspect of the invention may comprise at least one of the embodiments of the invention described above.

The invention allows serialized prevention of duplicate charging records. As a result, duplicate charging records may be prevented in a manner which does not cause loss of charging data records even in cases of multiple charging gateways being down or otherwise unreachable at a time.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
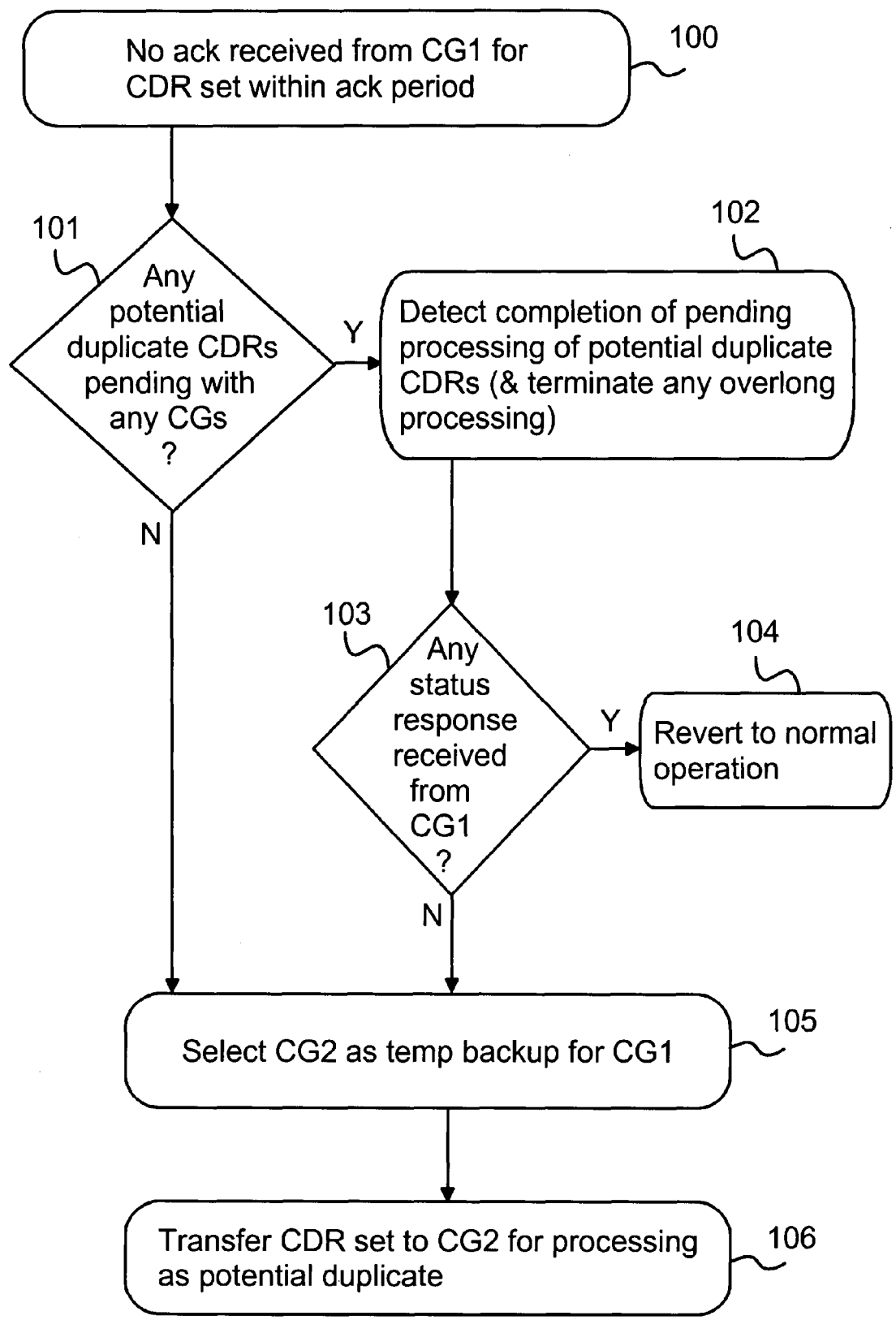
FIG. 1 is a flow diagram illustrating a method according to an embodiment of the present invention.

FIG. 1 is a flow diagram that illustrates a method related to serialized prevention of duplicate charging records according to an embodiment of the present invention. A charging data record generation unit (e.g. the serving general packet radio service support node 210 of FIG. 2) has a group of charging data record collection units (e.g. the charging gateways 231, 232, 233 of FIG. 2) associated with it. Charging data record sets are being transmitted from the charging data record generation unit to the associated charging data record collection units. Each associated charging data record collection unit is to send an acknowledgement (or a positive response) to the associated charging data record generation unit for each received charging data record set indicating that the charging data record set was successfully received and processed. In cases of a received charging data record set unsuccessfully processed (due to e.g. failure in the charging data record collection unit), a negative response may be sent to the charging data record generation unit, or no response at all may be sent to the charging data record generation unit if the charging data record collection unit is completely down. In cases of a charging data record set not received at all (due to e.g. link failure), again no response at all may be sent to the charging data record generation unit.

The charging data record set comprises at least one charging data record. Each charging data record comprises subscriber specific information about provided services for billing purposes, including e.g. identification of the subscriber in question, identification of the provided service session, and identifications of the network elements and network resources used to provide the service session.

A suitable telecommunications protocol may be used to facilitate the transfer of charging data record sets, and the transfer of acknowledgements and negative responses, as well as other messaging between a charging data record generation unit and its associated charging data record collection units. Such a suitable telecommunications protocol may be for GTP' or GTP prime protocol (in which GTP stands for GPRS Tunneling Protocol).

At step 100, it is detected that no acknowledgement (or positive response) has been received within a predetermined acknowledgement period for a given charging data record set that was transmitted from the charging data record generation unit to a first charging data record collection unit of its associated charging data record collection units. In an embodiment, the acknowledgement that should be received within the predetermined acknowledgement period may include a "Data Record Transfer Response" message of the GTP' protocol or an "Echo Response" message of the GTP' protocol.

In response, at step 101, it is checked whether processing of any charging data record set marked as a potential duplicate is currently pending with any associated charging data record collection unit.

If it is determined at step 101 that processing of at least one charging data record set marked as a potential duplicate is indeed pending, then the method proceeds to step 102. On the other hand, if it is determined at step 101 that processing of no charging data record set marked as a potential duplicate is pending, then the method proceeds directly to step 105.

Therefore, assuming that processing of at least one charging data record set marked as a potential duplicate was found pending at step 101, the method has now proceeded to step 102. At step 102, the pending processing of the at least one charging data record set marked as a potential duplicate is monitored in order to detect when it completes. Optionally, duration of the discovered pending processing of the at least one charging data record set marked as a potential duplicate may be measured, and, if the measured duration exceeds a predetermined threshold, the pending processing may be terminated.

Generally, processing of a charging data record set marked as a potential duplicate includes receiving the charging data record set at a charging data record collection unit, storing the charging data record set temporarily at the charging data record collection unit, sending further instructions from the charging data record generation unit to the charging data record collection unit regarding whether to delete the temporarily stored charging data record set or whether to forward the temporarily stored charging data record set to a billing system, sending an acknowledgement for the received further instructions from the charging data record collection unit to the charging data record generation unit, and finally executing the received further instructions at the charging data record collection unit. In the context of the present invention, however, the processing of the charging data record set marked as a potential duplicate, as well as the completion of this processing, is contemplated from the point of view of the charging data record generation unit. Therefore, the pending processing of the at least one charging data record set marked as a potential duplicate is considered completed when the above acknowledgement for the received further instructions is received at the charging data record generation unit.

In any case, after the completion (either by finishing in a normal manner or by termination) of the pending processing is detected at step 102, the method proceeds either directly to step 105, or to an optional step 103, as depicted in FIG. 1. At step 103, it is checked whether a status response was received from the first charging data record collection unit after the predetermined acknowledgement period. If the first charging data record collection unit that failed to acknowledge the given charging data record set was down at step 100, it may have been gone back to operational state since. Typically, in such a case a charging data record collection unit transmits a status response to its associated charging data record generation unit to indicate that it is operational again. Also, a status inquiry may first be sent to the first charging data record collection unit. If there was a link failure between the charging data record generation unit and the first charging data record collection unit which has since been fixed, the first charging data record collection unit will receive the status inquiry and respond with a status response indicating that it is operational.

If a status response indicating that the first charging data record collection unit is operational is received at step 103, the method proceeds to step 104 reverting back to normal operation. Normal operation may include e.g. re-transmitting the given charging data record set to the first charging data record collection unit in response to the first charging data record collection unit indicating that it failed to receive or process the given charging data record set. However, if no status response indicating the first charging data record collection unit being operational is received at step 103, the method proceeds to step 105.

At step 105, a second charging data record collection unit of the group of charging data record collection units is selected as a temporary backup charging data record collection unit. Then, at step 106, the given charging data record set is transferred to the selected second charging data record collection unit for processing as a potential duplicate.

The processing of the charging data record set marked as a potential duplicate and transferred to the selected second charging data record collection unit includes receiving the charging data record set at the second charging data record collection unit, storing the charging data record set temporarily at the second charging data record collection unit, receiving further instructions from the charging data record generation unit regarding whether to delete the temporarily stored charging data record set or whether to forward the temporarily stored charging data record set to a billing system, and finally executing the received instructions.

Also, as discussed above, the method may proceed to step 105 directly from step 101 if it is determined at step 101 that processing of no charging data record set marked as a potential duplicate is pending with any of the charging data record collection units. In such a case, a second charging data record collection unit of the group of charging data record collection units is again selected as a temporary backup charging data record collection unit, step 105. Then, the given charging data record set is transferred to the selected second charging data record collection unit for processing as a potential duplicate, step 106.

Figure 2:
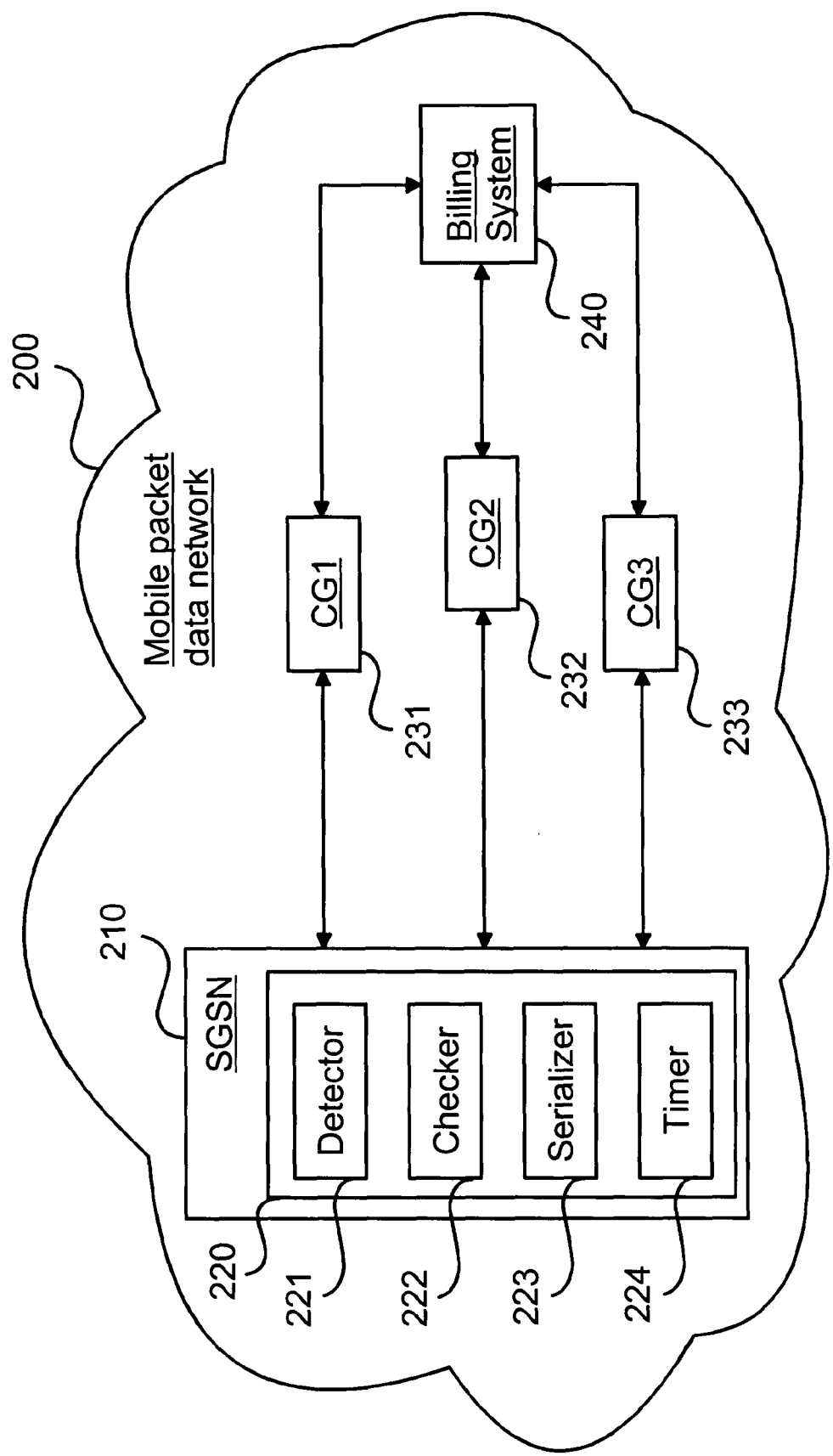
FIG. 2 is a block diagram illustrating an apparatus according to an embodiment of the present invention.

FIG. 2 is a block diagram that illustrates an apparatus related to serialized prevention of duplicate charging records according to an embodiment of the present invention. A mobile packet data telecommunications network 200—e.g. a General Packet Radio Service (GPRS) network or a $3^{rd}$ Generation Partnership Project (3GPP) packet data network—comprises a charging data record generation unit 210 which may comprise e.g. a serving general packet radio service support node (SGSN), as depicted in FIG. 2. Furthermore, in an embodiment, the charging data record generation unit 210 may comprise e.g. a Gateway General Packet Radio Service Support Nodes (GGSN), a Packet Data Gateway (PDG), a 3GPP AAA (Authentication, Authorization, and Accounting) proxy/server, or an MMS (Multimedia Messaging Service) relay/server, a Gateway Mobile Location Center (GMLC), a Push to Talk over Cellular (PoC) server, a Broadcast Multicast—Service Centre (BM-SC), and the like. In an embodiment, the charging data record generation unit 210 may comprise charging related network entities in an IP Multimedia Subsystem (IMS) of a 3GPP network, such as a Breakout Gateway Control Function (BGCF), Media Gateway Control Function (MGCF), a Proxy Call Session Control Function (P-CSCF), an Interrogating Call Session Control Function (I-CSCF), a Serving Call Session Control Function (S-CSCF), or a Session Initiation Protocol Application Server (SIP AS), and the like.

The mobile packet data telecommunications network 200 further comprises multiple charging data record collection units 231, 232, 233 associated with the charging data record generation unit 210. The charging data record collection units 231, 232, 233 are configured to collect and consolidate the charging data records generated by the associated charging data record generation unit 210, and to forward at least one of the collected charging records and charging information based on the collected charging records to a billing system 240. The charging data record collection units 231, 232, 233 may comprise e.g. charging gateways, as depicted in FIG. 2.

In an embodiment, the charging data record generation unit 210 may be configured to assign identifiers to the generated charging data records or charging data record sets. In an embodiment, such identifiers may be rotating or cyclic in the sense that the identifiers are assigned from a limited group of identifiers, and after the last identifier of the limited group of identifiers is assigned, the assignation order rotates or cycles back to the first identifier of the limited group of identifiers which will then be assigned next. In an embodiment, the identifiers may be sequence numbers.

An apparatus 220 comprises a detector 221 that is configured to detect whether an acknowledgement is received within a predetermined acknowledgement period for a given charging data record set transmitted from the charging data record generation unit 210 to a first charging data record collection unit, e.g. to the charging data record collection unit 231.

The apparatus 220 further comprises a checker 222 that is configured to check, in response to no acknowledgement detected as received within the predetermined acknowledgement period, whether processing of any charging data record set marked as a potential duplicate is currently pending with any of the charging data record collection units 231, 232, 233.

The apparatus 220 further comprises a serializer 223 that is configured, in response to a discovered pending processing of at least one charging data record set marked as a potential duplicate, (i) to detect completion of the discovered pending processing; (ii) to select, further in response to the detected completion of the pending processing, a second charging data record collection unit—e.g. charging data record collection unit 232—as a temporary backup charging data record collection unit; and (iii) to transfer the given charging data record set to the selected second charging data record collection unit 232 for processing as a potential duplicate.

The apparatus 220 further comprises a timer 224 that is configured to detect duration of the discovered pending processing, and to terminate the discovered pending processing in response to the detected duration exceeding a predetermined threshold.

In an embodiment, the serializer 223 may be further configured to check, after the detected completion of the pending processing, whether a status response was received from the first charging data record collection unit 231 after the predetermined acknowledgement period. In this embodiment, the serializer 223 is further configured to perform the selection of the second charging data record collection unit further in response to no received status response discovered.

Furthermore, in an embodiment, the serializer 223 may be further configured, in response to no discovered pending processing of any charging data record set marked as a potential duplicate, to select a second charging data record collection unit—e.g. charging data record collection unit 232—as a temporary backup charging data record collection unit, and to transfer the given charging data record set to the selected second charging data record collection unit 232 for processing as a potential duplicate.

The apparatus 220 may be arranged e.g. in the charging data record generation unit 210, as depicted in FIG. 2. Alternatively, the apparatus 220 may be arranged in connection with the charging data record generation unit 210. The detector 221, the checker 222, the serializer 223 and the timer 224 may be implemented as software, as hardware, or as a combination of hardware and software.

The exemplary embodiments can include, for example, any suitable servers, workstations, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDR, CD-RW, DVD, DVD-ROM, DVD±RW, DVD±R, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A method, comprising:
   detecting no acknowledgement received within a predetermined acknowledgement period for a given charging data record set transmitted from a charging data record generation unit of a mobile telecommunications network to a first charging data record collection unit of a group of charging data record collection units associated with said charging data record generation unit;
   checking whether processing of any charging data record set marked as a potential duplicate is currently pending with any charging data record collection unit of the group of charging data record collection units; and
   in response to discovering pending processing of at least one charging data record set marked as a potential duplicate:
   detecting completion of the pending processing of the at least one charging data record set marked as a potential duplicate,
   selecting, further in response to the detected completion of the pending processing, a second charging data record collection unit of the group of charging data record collection units as a temporary backup charging data record collection unit, and
   transferring said given charging data record set to the selected second charging data record collection unit for processing as a potential duplicate.

2. The method according to claim 1, further comprising:
   checking, after said detecting of the completion of said pending processing, whether a status response was received from the first charging data record collection unit after said predetermined acknowledgement period, wherein said selecting of the second charging data record collection unit is performed further in response to discovering no received status response.

3. The method according to claim 1, further comprising:
   in response to discovering no pending processing of any charging data record set marked as a potential duplicate:
   selecting the second charging data record collection unit of the group of charging data record collection units as a temporary backup charging data record collection unit, and
   transferring said given charging data record set to the selected second charging data record collection unit for processing as a potential duplicate.

4. The method according to claim 1, wherein a completion of the discovered pending processing of the at least one charging data record set marked as a potential duplicate further comprises detecting duration of the discovered pending processing, and terminating the discovered pending processing in response to the detected duration exceeding a predetermined threshold.

5. An apparatus comprising:
   a detector configured to detect whether an acknowledgement is received within a predetermined acknowledgement period for a given charging data record set transmitted from a charging data record generation unit of a mobile telecommunications network to a first charging data record collection unit of a group of charging data record collection units associated with said charging data record generation unit;
   a checker configured to check, in response to no acknowledgement detected as received within the predetermined acknowledgement period, whether processing of any charging data record set marked as a potential duplicate is currently pending with any charging record collection unit of the group of charging record collection units; and
   a serializer configured, in response to a discovered pending processing of at least one charging data record set marked as a potential duplicate:
   to detect completion of the pending processing of the at least one charging data record set marked as a potential duplicate,
   to select, further in response to the detected completion of the pending processing, a second charging data record collection unit of the group of charging data record collection units as a temporary backup charging data record collection unit, and
   to transfer said given charging data record set to the selected second charging data record collection unit for processing as a potential duplicate.

6. The apparatus according to claim 5, wherein the serializer is further configured to check, after said detected completion of said pending processing, whether a status response was received from the first charging data record collection unit after said predetermined acknowledgement period, and
   wherein the serializer is further configured to perform said selection of the second charging data record collection unit further in response to no received status response discovered.

7. The apparatus according to claim 5, wherein the serializer is further configured, in response to no discovered pending processing of any charging data record set marked as a potential duplicate:
   to select the second charging data record collection unit of the group of charging data record collection units as a temporary backup charging data record collection unit, and
   to transfer said given charging data record set to the selected second charging data record collection unit for processing as a potential duplicate.

8. The apparatus according to claim 5, further comprising a timer configured to detect duration of the discovered pending processing, and to terminate the discovered pending processing in response to the detected duration exceeding a predetermined threshold.

9. The apparatus according to claim 5, wherein the charging data record generation unit of the mobile telecommunications network comprises a serving general packet radio service support node.

10. The apparatus according to claim 5, wherein at least one charging data record collection unit of the group of charging data record collection units associated with the charging data record generation unit comprises a charging gateway configured to collect charging data records from the associated charging data record generation unit, and to forward at least one of the collected charging data records and charging information based on the collected charging data records to a billing system.

11. The apparatus according to claim 5, wherein the mobile telecommunications network comprises a mobile packet data telecommunications network.

12. An apparatus comprising:
- a detecting means for detecting whether an acknowledgement is received within a predetermined acknowledgement period for a given charging data record set transmitted from a charging data record generation unit of a mobile telecommunications network to a first charging data record collection unit of a group of charging data record collection units associated with said charging data record generation unit;
- a checking means for checking, in response to no acknowledgement detected as received within the predetermined acknowledgement period, whether processing of any charging data record set marked as a potential duplicate is currently pending with any charging data record collection unit of the group of charging data record collection units; and
- a serializing means for, in response to a discovered pending processing of at least one charging data record set marked as a potential duplicate:
  - detecting completion of the pending processing of the at least one charging data record set marked as a potential duplicate,
  - selecting, further in response to the detected completion of the pending processing, a second charging data record collection unit of the group of charging data record collection units as a temporary backup charging data record collection unit, and
  - transferring said given charging data record set to the selected second charging data record collection unit for processing as a potential duplicate.

13. The apparatus according to claim 12, wherein the serializing means further checks, after said detected completion of said pending processing, whether a status response was received from the first charging data record collection unit after said predetermined acknowledgement period, and
- wherein the serializing means performs said selection of the second charging data record collection unit further in response to no received status response discovered.

14. The apparatus according to claim 12, wherein the serializing means, in response to no discovered pending processing of any charging data record set marked as a potential duplicate:
- selects the second charging data record collection unit of the group of charging data record collection units as a temporary backup charging data record collection unit, and
- transfers said given charging data record set to the selected second charging data record collection unit for processing as a potential duplicate.

15. The apparatus according to claim 12, further comprising a timer means for detecting duration of the discovered pending processing, and for terminating the discovered pending processing in response to the detected duration exceeding a predetermined threshold.

16. The apparatus according to claim 12, wherein at least one charging data record collection unit of the group of charging data record collection units associated with the charging data record generation unit comprises a charging gateway means for collecting charging data records from the associated charging data record generation unit, and for forwarding at least one of the collected charging data records and charging information based on the collected charging data records to a billing system.

17. A computer program product comprising at least one tangible computer readable medium having a computer program stored thereon, the computer program comprising program instructions configured to cause a processor to at least perform:
- detecting no acknowledgement received within a predetermined acknowledgement period for a given charging data record set transmitted from a charging data record generation unit of a mobile telecommunications network to a first charging data record collection unit of a group of charging data record collection units associated with said charging data record generation unit;
- checking whether processing of any charging data record set marked as a potential duplicate is currently pending with any charging data record collection unit of the group of charging data record collection units; and
- in response to discovering pending processing of at least one charging data record set marked as a potential duplicate:
- detecting completion of the pending processing of the at least one charging data record set marked as a potential duplicate,
- selecting, further in response to the detected completion of the pending processing, a second charging data record collection unit of the group of charging data record collection units as a temporary backup charging data record collection unit, and
- causing said given charging data record set to be transferred to the selected second charging data record collection unit for processing as a potential duplicate.

18. The computer program product according to claim 17, further comprising program instructions configured to cause the processor to perform:
- checking, after said detecting of the completion of said pending processing, whether a status response was received from the first charging data record collection unit after said predetermined acknowledgement period,
- wherein said selecting of the second charging data record collection unit is performed further in response to discovering no received status response.

19. The computer program product according to claim 17, further comprising program instructions configured to cause the processor to perform:
- in response to discovering no pending processing of any charging data record set marked as a potential duplicate:
- selecting the second charging data record collection unit of the group of charging data record collection units as a temporary backup charging data record collection unit, and
- causing said given charging data record set to be transferred to the selected second charging data record collection unit for processing as a potential duplicate.

20. The computer program product according to claim 17, wherein a completion of the discovered pending processing of the at least one charging data record set marked as a potential duplicate further comprises detecting duration of the discovered pending processing, and terminating the discovered pending processing in response to the detected duration exceeding a predetermined threshold.

* * * * *